(12) United States Patent
Yeh

(10) Patent No.: US 6,567,076 B2
(45) Date of Patent: May 20, 2003

(54) HAND-WRITING INPUT AND RECORDING DEVICE

(75) Inventor: Edward Yeh, Taipei (TW)

(73) Assignee: Chenming Mold Ind. Corp., Taipei (TW)

( * ) Notice: Subject to any disclaimer, the term of this patent is extended or adjusted under 35 U.S.C. 154(b) by 107 days.

(21) Appl. No.: 09/756,771

(22) Filed: Jan. 10, 2001

(65) Prior Publication Data
US 2002/0089494 A1 Jul. 11, 2002

(51) Int. Cl.⁷ .................................................. G09G 5/00
(52) U.S. Cl. .................... 345/173; 345/164; 345/165; 345/166; 345/179; 345/180; 345/181; 345/182; 345/183; 178/19.03; 382/311; 382/312; 382/313; 382/314
(58) Field of Search ................................. 345/164–166, 345/179–183, 173; 178/19.05; 382/311–314

(56) References Cited
U.S. PATENT DOCUMENTS

| | | | | |
|---|---|---|---|---|
| 5,301,222 A | * | 4/1994 | Fujiwara | 379/58 |
| 5,371,516 A | * | 12/1994 | Toyoda et al. | 345/179 |
| 5,861,876 A | * | 1/1999 | Nakayama | 345/179 |
| 6,002,387 A | * | 12/1999 | Ronkka et al. | 345/157 |
| 6,188,392 B1 | * | 2/2001 | O'Connor et al. | 345/179 |

* cited by examiner

Primary Examiner—Richard Hjerpe
Assistant Examiner—Jennifer T. Nguyen
(74) Attorney, Agent, or Firm—Bacon & Thomas, PLLC

(57) ABSTRACT

A hand-writing input and recording device is housed in a case and may be hand-held by a user when in use. The device includes a contact element, an amplifying element, a sense element, an X-Y axes matrix element, a recording and storing element, a transmitting element and a receiving element. When the contact element generates a displacement variation in the X-Y axes, the X-Y axes displacement variation value will be emitted from the transmitting element to the receiving element and input into a computer for display on a computer screen to show the characters or patterns generated from the X-Y axes displacement variation value.

12 Claims, 4 Drawing Sheets

HAND-WRITING INPUT AND RECORDING DEVICE

BACKGROUND OF THE INVENTION

This invention relates to a hand-written input and recording device and particularly to a hand-held device for hand-written data entry and audio recording use.

In the early time when the personal computer was just introduced in the market place, to input Chinese characters into the computer mainly relied on data entry from a keyboard employing Tsang Jye code or Phonetic symbols. After processing by the computer, Chinese characters will be displayed on the screen for visual verification to complete the input process.

Users generally need to take a lot of exercise and practice to fully grasp the technique associated with Tsang Jye code or Phonetic symbols before they can enter Chinese characters reasonably fast for doing practical jobs. For novice or casual users, using Tsang Jye code or Phonetic symbols to enter Chinese characters into a computer is painfully time-consuming and tedious.

In order to remedy the aforesaid problem, some new innovations and techniques have been developed and introduced in recent years. Using an optical pen and optical panel for entering Chinese characters is one of the examples. When using this device, the computer screen will display a window to show the writing status of the optical pen on the optical panel. Hence even novice and casual users may enter Chinese characters into computer at a reasonably fast speed.

However when users also have to use the keyboard for doing other jobs, the optical panel becomes an awkward addition and takes too much desk top space. There is still room for improvement.

SUMMARY OF THE INVENTION

In view of the aforesaid disadvantages, it is therefore an object of this invention to provide a hand-writing input device for entering input data on a plane desktop surface into a computer without using an optical panel.

Another object of this invention is to provide a hand-writing input device that includes a recording function for users to record and store audio signals and broadcast the audio signals when desired.

A further object of this invention is to save users' useful desktop space.

In order to achieve the aforesaid objects, the hand-writing input and recording device according to this invention is housed in a case which may be hand-held by users when in use. The device includes a contact element, an amplifying element, a sense element, an X-Y axes matrix element, a recording and storing element, a transmitting element and a receiving element. When the contact element generates a displacement variation in X-Y axes, the resulting X-Y axes displacement variation value will be transmitted from the transmitting element to the receiving element and input into a computer which will display the characters or patterns generated from the X-Y axes displacement variation value on the computer screen.

BRIEF DESCRIPTION OF THE DRAWINGS

The invention, as well as its many advantages, may be further understood by the following detailed description and drawings, in which.

DESCRIPTION OF THE PREFERRED EMBODIMENTS

Figure 1:
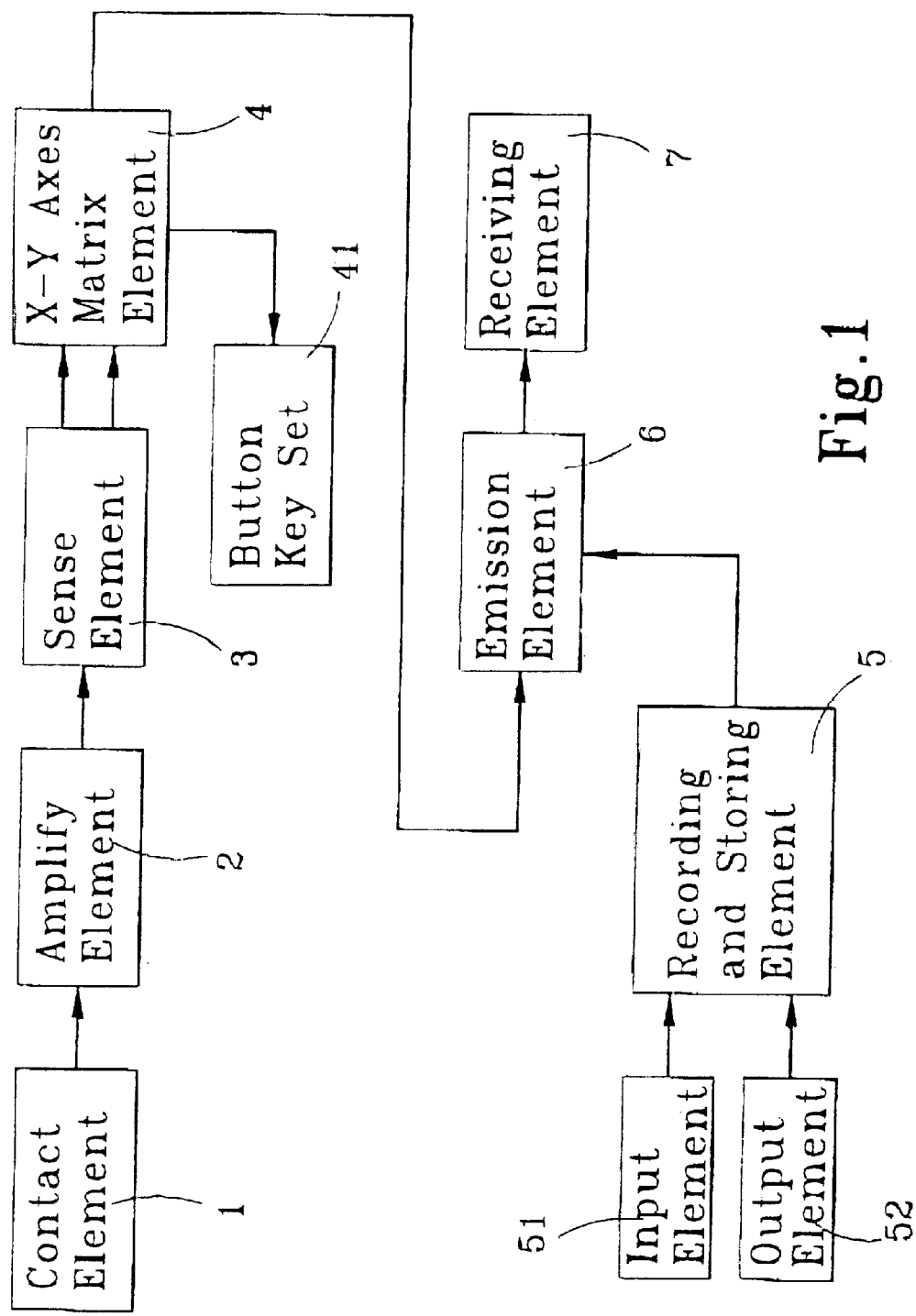
FIG. 1 is a circuit block diagram of this invention.
Figure 2:
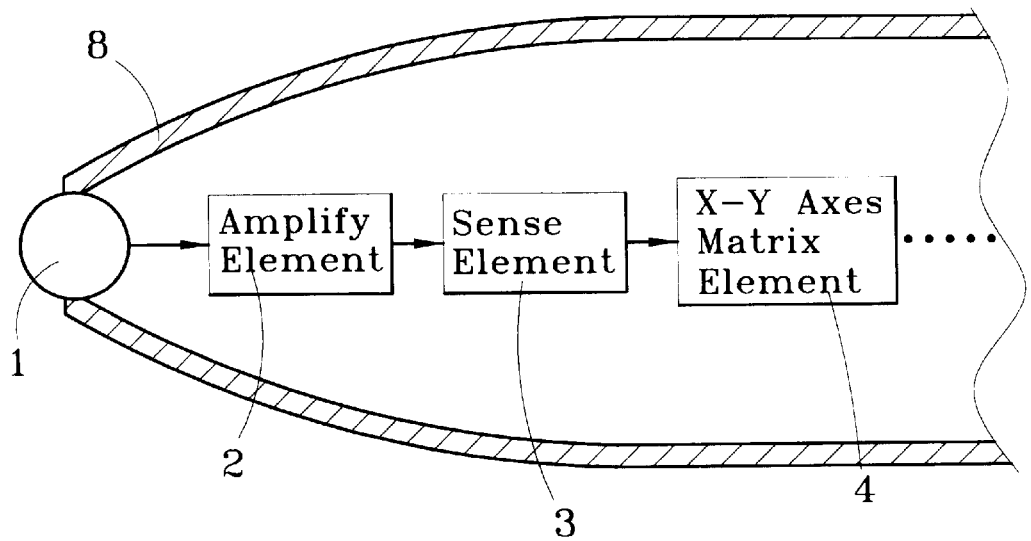
FIG. 2 is a cross-sectional schematic view of a first embodiment of this invention.

Referring to FIGS. 1 and 2 for the first embodiment of this invention, the hand-written input and recording device is housed in a case 8 which may be hand-held by a user when in use. The device includes a contact element 1, an amplify element 2, a sense element 3, an X-Y axes matrix element 4, a recording and storing element 5, a transmitting element 6 and a receiving element 7. When the contact element 1 generates a displacement variation value with respect to the X-Y axes, the X-Y axes displacement variation value will be transmitted by the transmission element 6 to the receiving element and input into a computer (not shown in the figures) for displaying on the computer screen the characters or patterns generated from the X-Y axes displacement variation value.

The contact element 1 is a spherical body which may roll and generate an X-Y axes displacement variation value output.

The amplify element 2 is for amplifying the generated X-Y axes displacement variation value signal, and may be, but is not limited to, a mechanical type, an electronic type or an optical type.

The sense element 3 senses the amplified X-Y axes displacement variation value signal from the amplify element 2 and outputs the signal through an optical fiber.

The X-Y axes matrix element 4 includes at least one set of buttons or keys 41 for processing the X-Y axes displacement variation value signal output by the sense element 3. The X-Y axes displacement variation value signal may also be transmitted wirelessly for a short distance through the transmitting element 6.

The recording and storing element 5 is for recording and storing audio signals. It links to an input element (microphone) 51 concealed inside the case 8 and an output element (speaker) 52. The input element 51 is a non-directional high sensitive microphone to serve as a recording device for transmitting to a Digital Signal Processor (DSP) for storing and broadcasting the audio source. The audio source may also be transmitted wirelessly for a short distance through the transmission element 6.

The transmitting element 6 is a radio frequency transmitter for receiving signals output by the X-Y axes matrix element 4 and recording and storing element 5, and transmitting the signals for a short distance (which may be, but is not limited to, 10–20 meters).

The receiving element 7 is located inside the computer or in another case 8. It has an Input/Output (I/O) interface which may be, but is not limited to, a USB port or other standard interface. Based on the foregoing elements, the hand-writing input and recording device of this invention may be constructed as a hand-held type device.

When in use, the contact element 1 generates an X-Y axes displacement variation value signal which is amplified by the amplifying element 2 and sensed by the sense element 3. The sensed X-Y axes displacement variation value signal then is output through the optical fiber. The X-Y axes matrix element 4 receives and processes the signal, and then the emission element 6 transmits the signal for a short distance wirelessly. The receiving element 7 receives the X-Y axes displacement variation value signal and transfers it to the computer for processing and displaying oil the computer screen in characters or patterns in accordance with the XY axes displacement variation value.

When this invention is used for audio recording purposes, the input element 51 receives an audio signal and transmits it to the digital DSP for storing and broadcasting. The audio source may also be transmitted wirelessly for a short distance through the transmitting element 6. The receiving element 7 receives the signal and transmits immediately to the computer for processing. The button key set 41 is linked to the X-Y axes matrix element 4 and may be used for function selection and process confirmation.

Figure 3:
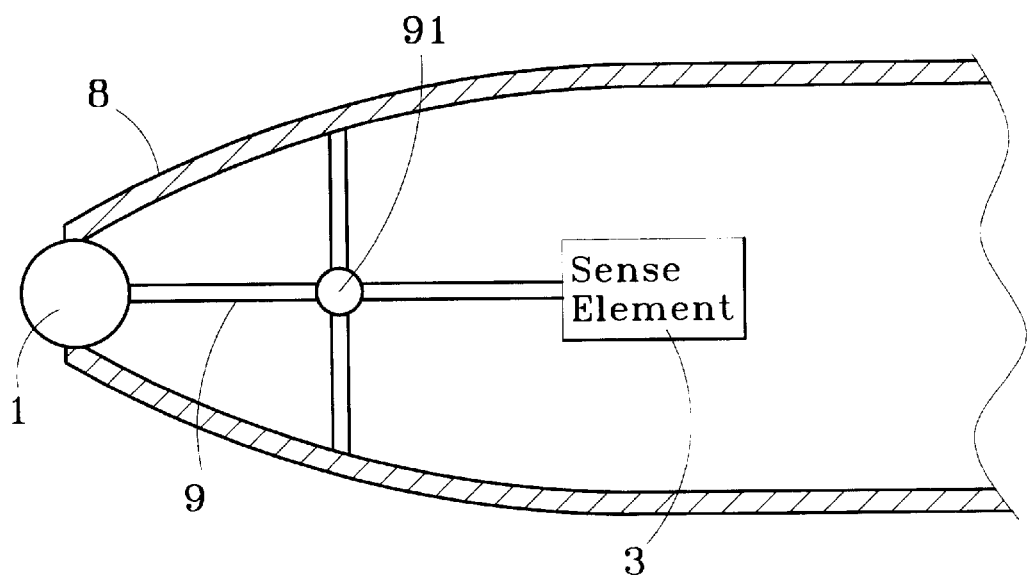
FIG. 3 is a cross-sectional schematic view of a second embodiment of this invention.

FIG. 3 illustrates the second embodiment of this invention which is largely constructed like the first embodiment shown in FIG. 2, but in which the amplify element 2 is a mechanical type for amplifying the X-Y axes displacement variation value signal. It has a bar 9 located in the case 8. The bar 9 has one end in contact with the contact element 1 and another end that contacts the sense element 3. The bar 9 further includes a bearing 91 disposed at a selected location thereof. When the contact element 1 moves and actutates the bar 9, the X-Y axes displacement variation value signal will be amplified by the bar 9 and sensed by the sense element 3.

Figure 4:
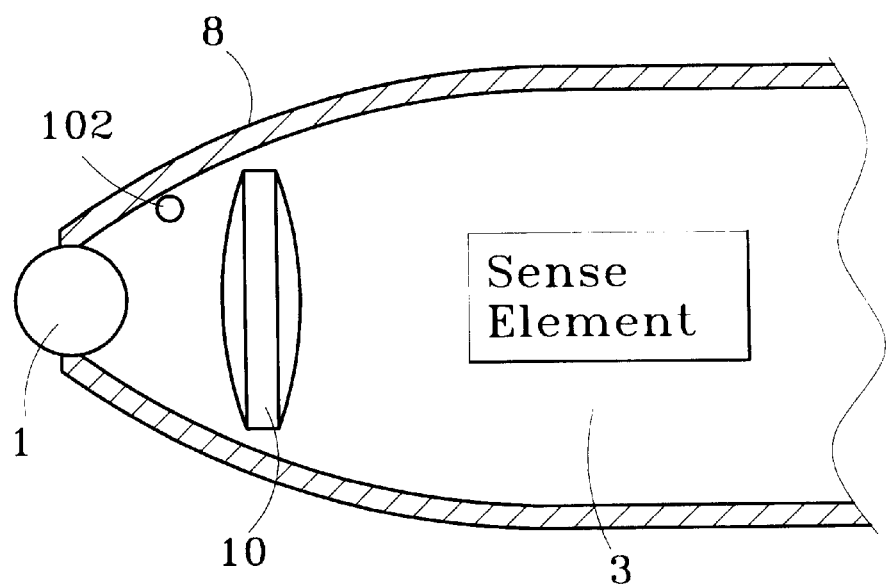
FIG. 4 is a cross-sectional schematic view of a third embodiment of this invention.

FIG. 4 shows the third embodiment of this invention which is largely constructed like the first embodiment shown in FIG. 2, but in which the amplify element 2 is an optical type and the contact element 1 is transparent. When the contact element 1 moves, an external light source (or light generated from inside the case 8 and projected outward) forms an image of the X-Y axes displacement variation value signal generated by the contact element 1. The image is amplified by a lens 10 and projected immediately on the sense element 3. When there is an internal light source 102 located inside the case 8, the light source will be projected to the contact element 1. Then the displacement variation value image generated by the contact element 1 will be amplified by the lens 10 and projected to the sense element 3.

Figure 5:
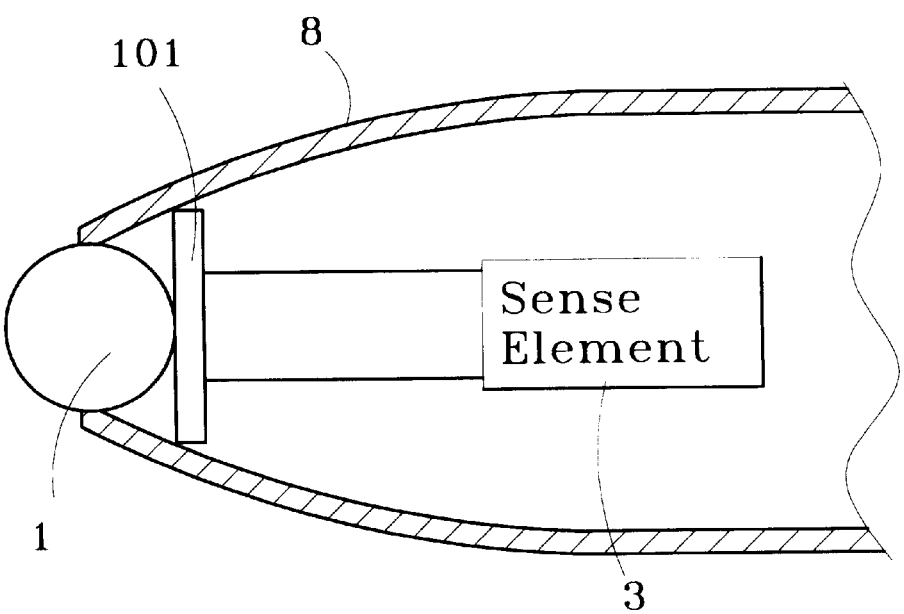
FIG. 5 is a cross-sectional schematic view of a fourth embodiment of this invention.

FIG. 5 depicts the fourth embodiment of this invention which is largely constructed like the first embodiment shown in FIG. 2, but in which the amplify element 2 is an electronic type. There is a circuit board 101 which has a contact surface formed with different resistance values. When the contact element 1 makes rolling contact on the circuit board 101, the circuit board 101 will output different resistance variations which may be used for generating X-Y axes displacement variation value signals.

Figure 6:
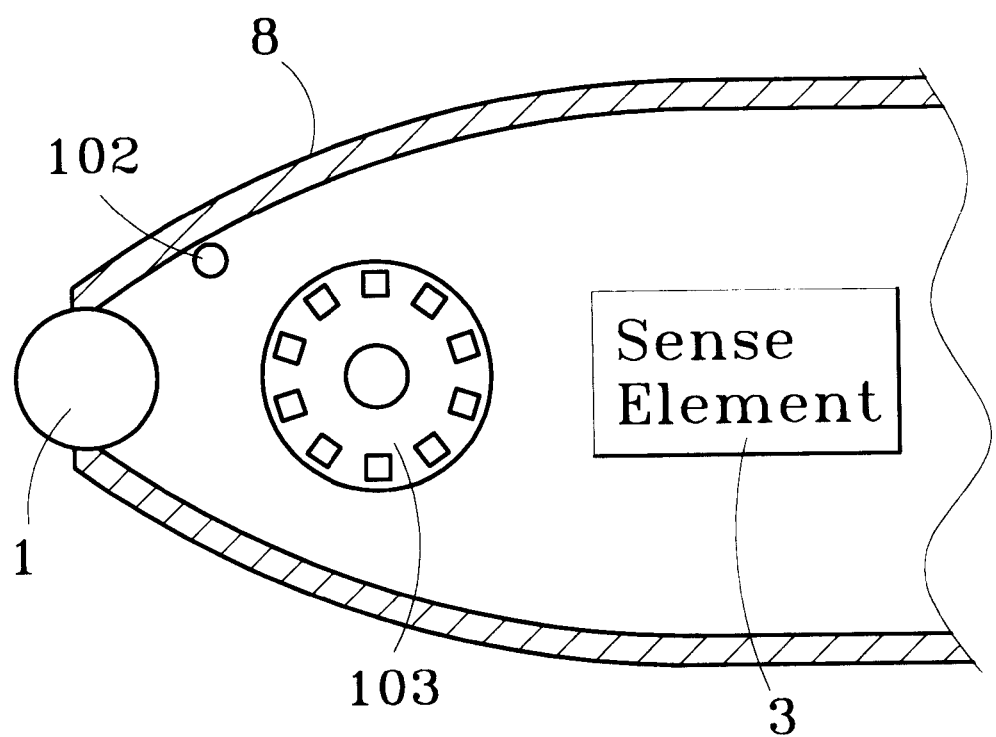
FIG. 6 is a cross-sectional schematic view of a fifth embodiment of this invention.

FIG. 6 shows the fifth embodiment of this invention which is largely constructed like the third embodiment shown in FIG. 4, but in which the amplify element 2 is another optical type which uses an optical grate 103. When projecting by the light source 102, the contact element 1 reflects the light to the optical grate 103 which in turn generates binary signals to the sense element 3 for sensing displacement variation value.

What is claimed is:

1. A hand-writing input and recording device housed in a hand-held case, comprising:

a contact element for generating output signals including an X-Y axes displacement variation value;

an amplify element for receiving and amplifying said output signals including the X-Y displacement variation value;

a sense element for receiving the amplified signals of the X-Y axes displacement variation value from the amplify element;

an X-Y axes matrix element linked to an output end of the sense element for processing the X-Y axes displacement variation value signals output by the sense element;

a recording and storing element for recording and storing audio signals;

a transmitting element linked to the X-Y axes matrix element and recording and storing element for receiving signals output therefrom and performing transmission for a short distance; and a receiving element for receiving the X-Y axes displacement variation value signals from the transmitting element and transmitting the signals to a computer for processing, and through the recording and storing element for recording and storing audio signals; the audio signals also being transmitted by the transmitting element to the receiving element for transfer to the computer for processing, wherein the amplify element is a mechanical type for amplifying the X-Y axes displacement variation value signals and includes a bar located in the case, the bar having one end in contact with the contact element and another end that contacts the sense element, and having a bearing located at a selected position thereof.

2. The hand-writing input and recording device of claim 1, wherein the X-Y axes matrix element links to at least one button key set.

3. The hand-writing input and recording device of claim 1, wherein the recording and storing element links to an input and output element concealed in the case, the input element being a non-directional high sensitive microphone, and the output element being a speaker.

4. The hand-writing input and recording device of claim 1, wherein the receiving element is selectively located in the computer or another case and having an input/output interface which is selectively a USB port or other standard interface.

5. The hand-writing input and recording device of claim 1, wherein the X-Y axes matrix element links to at least one button key set.

6. The hand-writing input and recording device of claim 1, wherein the recording and storing element links to an input and output element concealed in the case, the input element being a non-directional high sensitive microphone, and the output element being a speaker.

7. The hand-writing input and recording device of claim 1, wherein the receiving element is selectively located in the computer or another case and having an input/output interface which is selectively a USB port or other standard interface.

8. A hand-writing input and recording device housed in a hand-held case, comprising:

a contact element for generating an output signals including an X-Y axes displacement variation value;

an amplify element for receiving and amplifying said output signals including the X-Y displacement variation value;

a sense element for receiving the amplified signals of the X-Y axes displacement variation value from the amplify element;

an X-Y axes matrix element linked to an output end of the sense element for processing the X-Y axes displacement variation value signals output by the sense element;

a recording and storing element for recording and storing audio signals;

a transmitting element linked to the X-Y axes matrix element and recording and storing element for receiving signals output there from and performing transmission for a short distance; and a receiving element for receiving the X-Y axes displacement variation value signals from the transmitting element and transferring the signals to a computer for processing, and through the recording and storing element for recording and storing audio signals; the audio signals also being transmitted by the transmitting element to the receiving element for transfer to the computer for processing, wherein the amplify element is an electronic type having a circuit board which has a contact surface printed with different resistance values enabling the contact element rolling thereon to cause the circuit board to output different resistance variation values to thereby sense the X-Y axes displacement variation value signals generated by the contact element.

9. The hand-writing input and recording device of claim 8, wherein the X-Y axes matrix element links to at least one button key set.

10. The hand-writing input and recording device of claim 8, wherein the recording and storing element links to an input and output element concealed in the case, the input element being a non-directional high sensitive microphone, and the output element being a speaker.

11. The hand-writing input and recording device of claim 8, wherein the receiving element is selectively located in the computer or another case and having an input/output interface which is selectively a USB port or other standard interface.

12. A hand-writing input and recording device housed in a hand-held case, a contact element for generating an output signals including an X-Y axes displacement variation value;

an amplify element for receiving and amplifying said output signals including the X-Y displacement variation value;

a sense element for receiving the amplified signals of the X-Y axes displacement variation value from the amplify element;

an X-Y axes matrix element linked to an output end of the sense element for processing the X-Y axes displacement variation value signals output by the sense element;

a recording and storing element for recording and storing audio signals;

a transmitting element linked to the X-Y axes matrix element and recording and storing element for receiving signals output therefrom and performing transmission for a short distance; and a receiving element for receiving the X-Y axes displacement variation value signals from the transmitting element and transfering the signals to a computer for processing, and through the recording and storing element for recording and storing audio signals; the audio signals also being transmitted by the transmitting element to the receiving element for transfer to the computer for processing, wherein the amplify element is an optical type including an optical grate and a light source which projects light on the contact element which in turn reflects light to the optical grate for the same to generate binary signals which are sensed by the sense element to thereby sense the displacement variation value generated by the contact element.

* * * * *